(12) United States Patent
Henze et al.

(10) Patent No.: US 10,407,163 B2
(45) Date of Patent: Sep. 10, 2019

(54) AIRCRAFT CONTROL SYSTEM AND METHOD

(71) Applicant: Hamilton Sundstrand Corporation, Windsor Locks, CT (US)

(72) Inventors: Chad M. Henze, Granby, CT (US); Robert H. Perkinson, Stonington, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 285 days.

(21) Appl. No.: 15/420,846

(22) Filed: Jan. 31, 2017

(65) Prior Publication Data

US 2017/0137114 A1 May 18, 2017

Related U.S. Application Data

(63) Continuation of application No. 14/054,944, filed on Oct. 16, 2013, now Pat. No. 9,604,729.

(51) Int. Cl.
| | |
|---|---|
| *B64C 19/00* | (2006.01) |
| *B64D 31/00* | (2006.01) |
| *B64C 11/30* | (2006.01) |
| *B64C 11/48* | (2006.01) |

(52) U.S. Cl.
CPC ............ *B64C 19/00* (2013.01); *B64C 11/306* (2013.01); *B64C 11/48* (2013.01); *B64D 31/00* (2013.01)

(58) Field of Classification Search
CPC ........ B64D 31/00; B64C 11/306; B64C 19/00
See application file for complete search history.

(56) References Cited

U.S. PATENT DOCUMENTS

| | | | | |
|---|---|---|---|---|
| 2,308,802 A | * | 1/1943 | Barling | B64C 29/02 |
| | | | | 244/17.19 |
| 2,328,786 A | * | 9/1943 | Crowder | B64C 29/02 |
| | | | | 244/17.23 |
| 2,712,420 A | * | 7/1955 | Amster | B64C 29/0091 |
| | | | | 244/100 R |

(Continued)

OTHER PUBLICATIONS

Office Action regarding related GB Application No. GB1418287.7; dated May 11, 2015; 6 pgs.

*Primary Examiner* — Eldon T Brockman
(74) *Attorney, Agent, or Firm* — Cantor Colburn LLP

(57) ABSTRACT

An aircraft control system includes a propeller shaft assembly. Also included is first rotor operatively coupled to the propeller shaft assembly, the first rotor having a first plurality of blades mounted thereto, the first blades disposed at a substantially identical nominal pitch during rotation of the first rotor, the first rotor rotatable in a first direction. Further included is a second rotor operatively coupled to the propeller shaft assembly and rotatable in a second direction, the second rotor having a second plurality of blades mounted thereto, wherein a pitch of the second blades cyclically changes during rotation of the second rotor, the first rotor and the second rotor disposed and rotated proximate a fixed wing of an aircraft about a common axis extending parallel to a longitudinal axis of the aircraft, cyclically changing the pitch of the second plurality of blades generating a moment for controlling the aircraft.

6 Claims, 4 Drawing Sheets

(56) References Cited

U.S. PATENT DOCUMENTS

| | | | | |
|---|---|---|---|---|
| 2,738,148 | A * | 3/1956 | Stulen | B64C 23/005 244/65 |
| 2,950,074 | A * | 8/1960 | Apostolescu | B64C 27/14 244/17.23 |
| 3,179,352 | A * | 4/1965 | Nelson | B64C 29/0033 244/7 C |
| 4,589,611 | A * | 5/1986 | Ramme | B64C 27/10 244/12.3 |
| 5,054,716 | A | 10/1991 | Wilson | |
| 5,381,985 | A | 1/1995 | Wechsler | |
| D394,422 | S | 5/1998 | Magee | |
| 6,981,844 | B2 | 1/2006 | Perkinson et al. | |
| 7,861,967 | B2 | 1/2011 | Karem | |
| 8,146,854 | B2 * | 4/2012 | Lawrence | B64C 39/024 244/17.23 |
| 8,337,156 | B2 * | 12/2012 | Khmel | B64C 11/306 416/27 |
| 8,500,062 | B2 | 8/2013 | Brunken, Jr. | |
| 8,505,846 | B1 * | 8/2013 | Sanders, II | B64C 29/02 244/7 A |
| 2002/0109044 | A1 * | 8/2002 | Rock | B64C 27/10 244/17.23 |
| 2005/0079053 | A1 * | 4/2005 | Perkinson | B64C 11/40 416/98 |
| 2010/0193644 | A1 | 8/2010 | Karem | |
| 2011/0052392 | A1 * | 3/2011 | Khmel | B64C 11/306 416/1 |

* cited by examiner

AIRCRAFT CONTROL SYSTEM AND METHOD

CROSS-REFERENCE TO RELATED APPLICATION

This patent application is a continuation of, and claims priority to, U.S. Provisional patent application Ser. No. 14/054,944, filed Oct. 16, 2013, which is incorporated herein by reference in its entirety.

BACKGROUND

The embodiments herein relate to aircrafts and, more particularly, to an aircraft control system, as well as a method of controlling an aircraft.

Design of rotors and propellers is quite complex. A large number of factors must be taken into account, including flexure of the rotor under heavy loads and the required motions of the rotor blades with respect to the drive mechanism.

Rigid turboprop propeller systems provide collective pitch control of the propeller blades. Pitch angles ranging from a fully feathered minimum drag angle to pitch angles which provide reverse thrust are typically provided to provide propeller speed and power management. Inflow angles not along the axis of rotation due to aircraft maneuvers generate bending moments on the propeller shaft and subsequent twisting of the airframe. The resulting bending moments can be rather large and conventional propeller systems are therefore rigidly structured.

Fully articulated rotors such as those of helicopters provide cyclic and collective pitch of the rotor blades. Articulation of the rotor disc plane vectors the rotor thrust to provide fore, aft and lateral movement of the helicopter with minimal bending moment of the rotor shaft. As compared to rigid turboprop propeller systems, articulated rotor systems of a helicopter are significantly more complex. As such, the control benefits associated with fully articulated rotors are offset by the design and operational complexity.

BRIEF DESCRIPTION

Disclosed is an aircraft control system includes a propeller shaft assembly. Also included is first rotor operatively coupled to the propeller shaft assembly, the first rotor having a first plurality of blades mounted thereto, wherein the first plurality of blades are disposed at a substantially identical nominal pitch during rotation of the first rotor, the first rotor rotatable in a first direction. Further included is a second rotor operatively coupled to the propeller shaft assembly and rotatable in a second direction that is opposite of the first direction, the second rotor having a second plurality of blades mounted thereto, wherein a pitch of the second plurality of blades cyclically changes during rotation of the second rotor, the first rotor and the second rotor disposed and rotated proximate a fixed wing of an aircraft about a common axis extending parallel to a longitudinal axis of the aircraft, cyclically changing the pitch of the second plurality of blades generating a moment for controlling the aircraft.

BRIEF DESCRIPTION OF THE DRAWINGS

The subject matter which is regarded as the disclosure is particularly pointed out and distinctly claimed in the claims at the conclusion of the specification. The foregoing and other features and advantages of the disclosure are apparent from the following detailed description taken in conjunction with the accompanying drawings in which:

DETAILED DESCRIPTION

Figure 1:
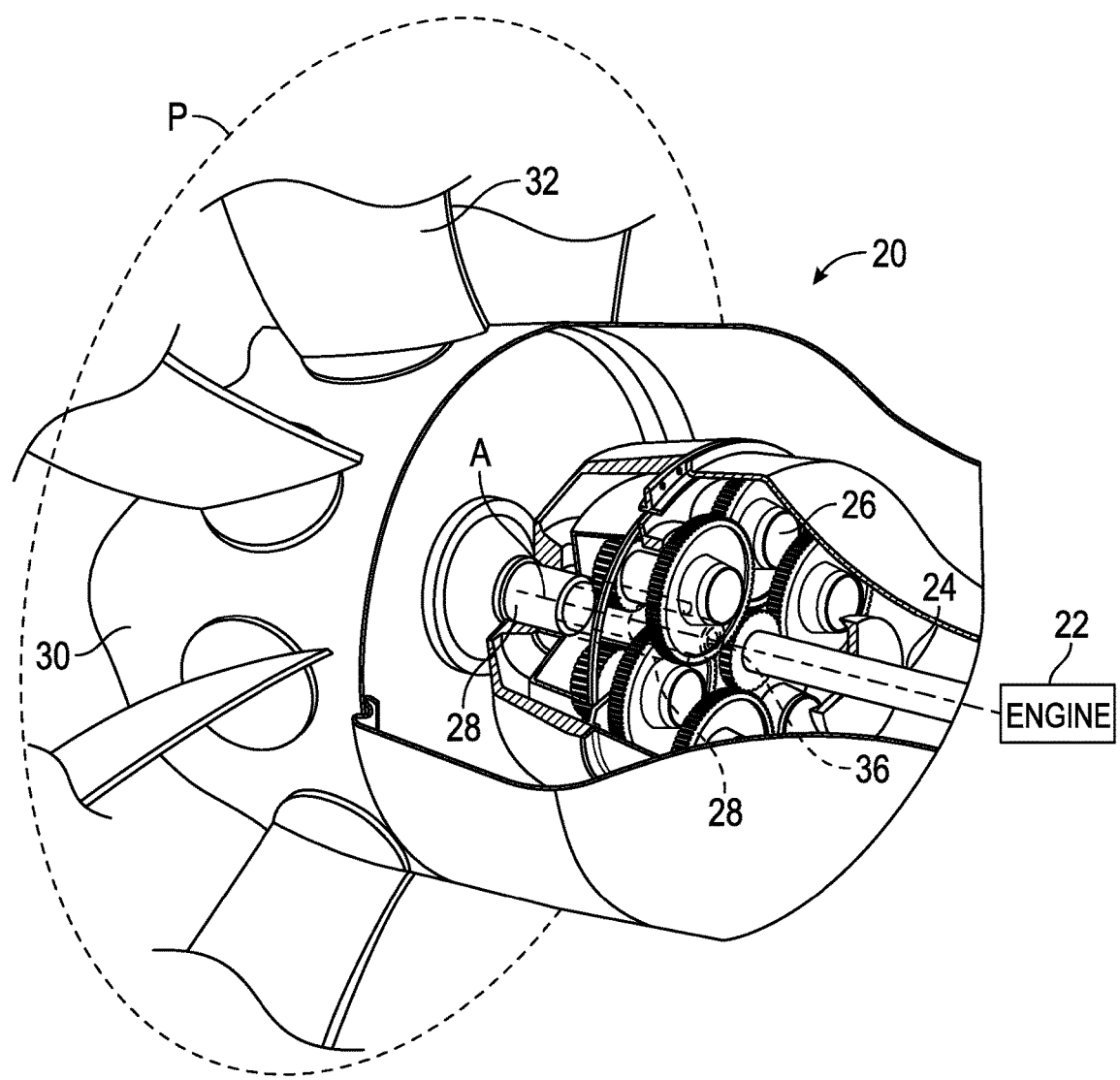
FIG. 1 is a general perspective view of a turboprop assembly driven by an engine.

Referring to FIG. 1, a general perspective view of a propeller system 20 is illustrated. It should be understood that although a propeller system typical of a turboprop aircraft is illustrated in the disclosed embodiment, various rigid prop/rotor systems including tilt rotor and tilt wing systems will benefit from the embodiments described herein.

A gas turbine engine (illustrated schematically at 22) which rotates a turbine output shaft 24 at a high speed powers the propeller system 20. The turbine output shaft 24 drives a gear reduction gearbox (illustrated somewhat schematically at 26) which decreases shaft rotation speed and increases output torque. The gearbox 26 drives a propeller shaft assembly 28 which rotates a propeller hub 30 and a plurality of propeller blades 32 which extend therefrom. It should be understood that a conventional offset gearbox will also benefit from the disclosed embodiments. Axis A is substantially perpendicular to a plane P which is defined by the plurality of propeller blades 32. It should be understood that an in-line and an offset gearbox will benefit from the disclosed embodiments.

Figure 2:
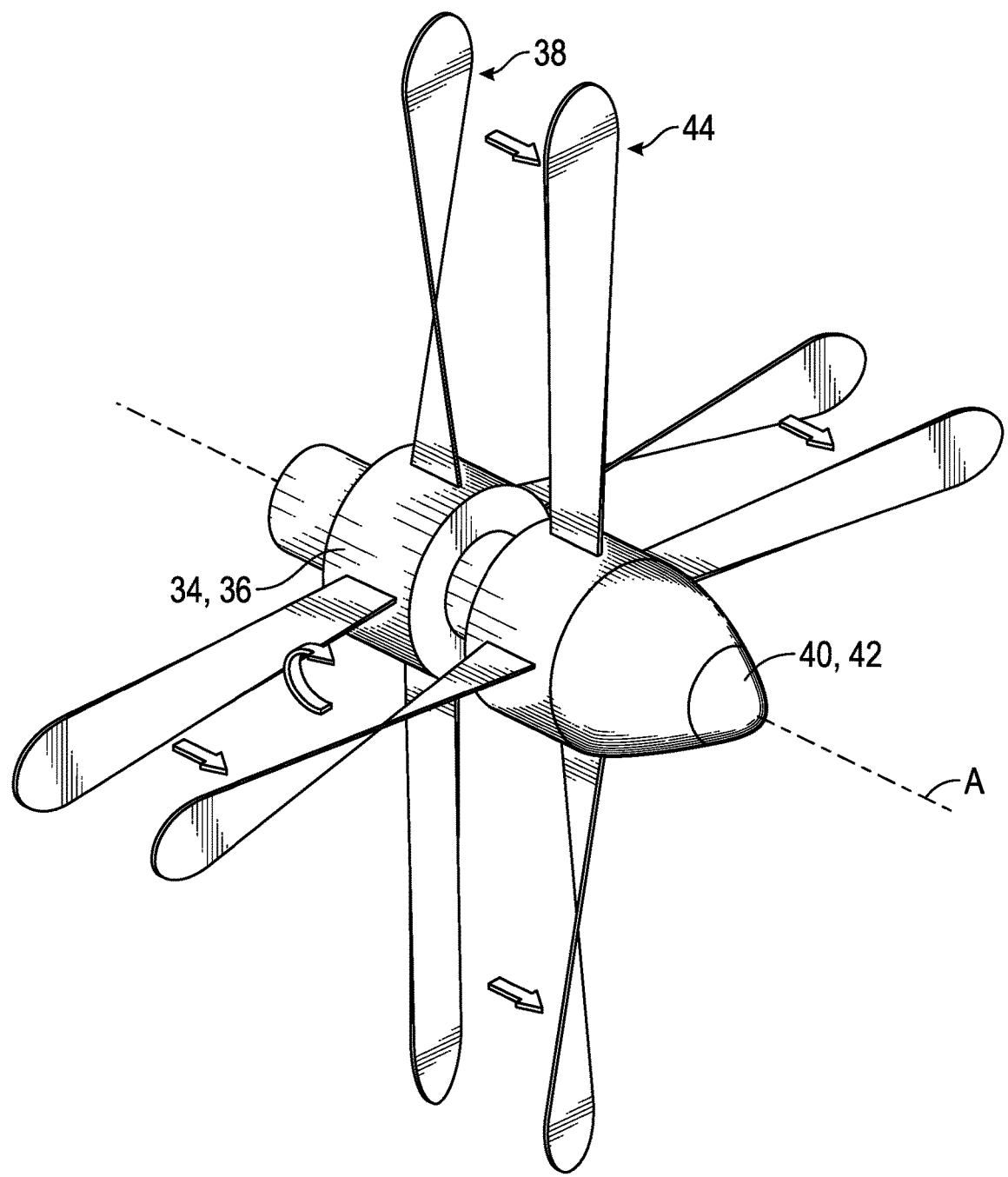
FIG. 2 is a schematic force diagram of a co-axial, counter-rotating propeller assembly.

Referring to FIG. 2, the propeller shaft assembly 28 and associated components are further illustrated. In particular, the propeller shaft assembly 28 shown is a co-axial, counter-rotating propeller shaft assembly and the propeller system 20 operates as an aircraft control system, as described in detail below. The propeller system 20 includes a first rotor 34 having a first hub 36 operatively coupled thereto. Extending from the first hub is a first plurality of blades 38. A second rotor 40 having a second hub 42 operatively coupled thereto is included, with a second plurality of blades 44 extending from the second hub 42. As noted above, the first rotor 34 and the second rotor 40, and therefore the first plurality of blades 38 and the second plurality of blades 44, are configured to rotate in opposite directions about a common axis A with both rotors producing thrust in the same direction. As will be described in detail below, the second plurality of blades 44 is configured to be capable of cyclically changing pitch during rotation of the second rotor 40. In contrast, each of the first plurality of blades 38 is disposed at a substantially identical nominal pitch during rotation of the first rotor 34. The nominal pitch of first the plurality of blades 38 may change based on power input and operating conditions, for example, but each of the blades of the first rotor 34 are at the substantially identical pitch. The "pitch" of the blades is defined as the rotational position of the blade about an axis from the root of the blade to the tip of the blade.

The arrows in FIG. 2 indicate the direction of the airflow. In the illustrated embodiment, the engine 22 driving the propeller system 20 is upstream of both rotors and the first rotor 34 is upstream of the second rotor 40. This embodiment is commonly referred to as a "pusher" configuration. In an alternative embodiment, the direction of the airflow is reversed, such that the second rotor 40 is upstream of the first rotor 34, which are both upstream of the engine 22. This embodiment is commonly referred to as a "tractor" or "puller" configuration. Most importantly, and irrespective of an upstream-downstream configuration, it is less complex to accomplish cyclic pitch on the rotor that is closest to the engine. However, it is contemplated that cyclic pitch is actuated on the rotor located furthest from the engine 22, either in addition to actuation of cyclic pitch on the other rotor or in combination therewith.

In operation, the propeller system 20 generates a once per revolution (1P) variation in blade load through cyclic pitch of the first plurality of blades 38. While the axis of the thrust vector remains perpendicular to the plane of the first plurality of blades 38, the variation in blade load creates a bending moment on the propeller shaft assembly 28 which appears fixed in relation to the aircraft. There is also a relatively small in-plane force generated due to the difference in torque on opposing blades. Such 1P variations may occur during aircraft maneuvering when inflow angles are not on the propeller axis of rotation. Conventional blade mounting arrangements accommodate these off-axis forces by rigidly mounting the propeller blades to the hub to prevent flapping and rigidly mount the propeller shaft assembly 28 to the gearbox 26 (FIG. 1). Off-axis forces are thereby transmitted directly from the propeller blades to the airframe. The embodiments herein advantageously utilize this conventional mounting arrangement to generate aircraft attitude control through generation of a moment about the propeller shaft 28 assembly (FIG. 1). Various structures and methods relating to cyclic pitch may be employed to facilitate cyclically changing the pitch of the second plurality of blades 44. For example, commonly owned U.S. Pat. No. 6,981,844, describes such a structure and method, the disclosure of which is incorporated by reference herein. It is to be appreciated that the specific structure and method disclosed in the above-referenced disclosure is not limiting of alternative cyclic pitch embodiments. It is to be understood that the general concept of cyclically changing the pitch of propeller blades is applied to only one propeller blade set of a co-axial, counter-rotating propeller shaft assembly. In particular, the pitch of the first plurality of blades 38 is cyclically changed during rotation.

Figure 3:
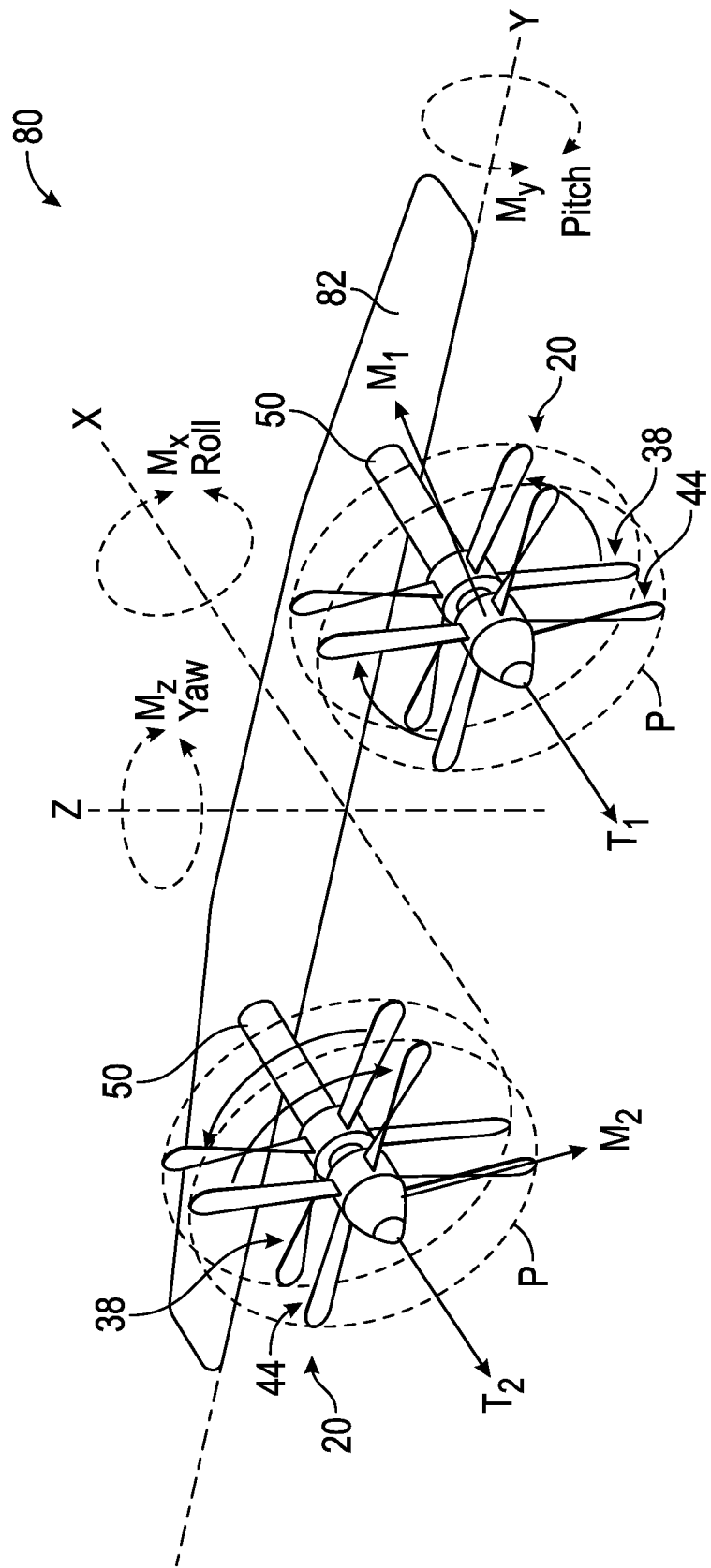
FIG. 3 is a schematic force diagram of an aircraft utilizing the propeller assembly according to an exemplary embodiment.

Referring to FIG. 3, an aircraft (illustrated schematically at 80) with a wing 82 for providing lift and one or more propeller systems 20 is shown according to one embodiment. The propeller systems 20 produce forward thrust and incorporate a pitch change actuator assembly 50. As indicated, the propeller systems 20 provide Thrust (T1 & T2), and Moments (M1 & M2). Moments M1 & M2 are vectorally represented using the conventional "right hand rule" notation and may be directed anywhere, independently of each other 360 degrees within the plane of rotation of the second plurality of propeller blades.

The appropriate combination of the vectors M1 & M2 & T1 and T2 will produce desired, roll, pitch and yaw moments Mx, My & Mz as desired to control the pitch, roll and yaw of the aircraft 80. In addition, the thrust vectors T1 and T2 may be combined to contribute to the moment Mz on the aircraft to control the yaw as required. The roll is controlled by the coordinated application of a difference in the thrusts, T1 and T2, in combination with moments in the yaw direction. The resultant in-plane shear forces cause the aircraft to roll. Each of the moments and vectors described above are provided by the incorporation of directional cyclic pitch through the pitch change actuator assembly 50 of the embodiments described herein in combination with the normal propeller function of producing thrust for forward flight.

In the illustrated embodiment of FIG. 3, the propeller system 20 is illustrated proximate a wing of the aircraft 80, however, in an alternative embodiment the propeller system 20 described in detail above is disposed proximate a nose of the aircraft 80. In such an embodiment, the co-axial, counter-rotating propeller shaft assembly 28 facilitates vertical takeoff of the aircraft 80 from a "tail-sitter" position. Specifically, the aircraft 80 may be initially positioned in a substantially vertical position and the control capabilities provided by the propeller system 20 facilitates takeoff thrust and initial maneuvering control of the aircraft 80 during takeoff from such a position.

Figure 4:
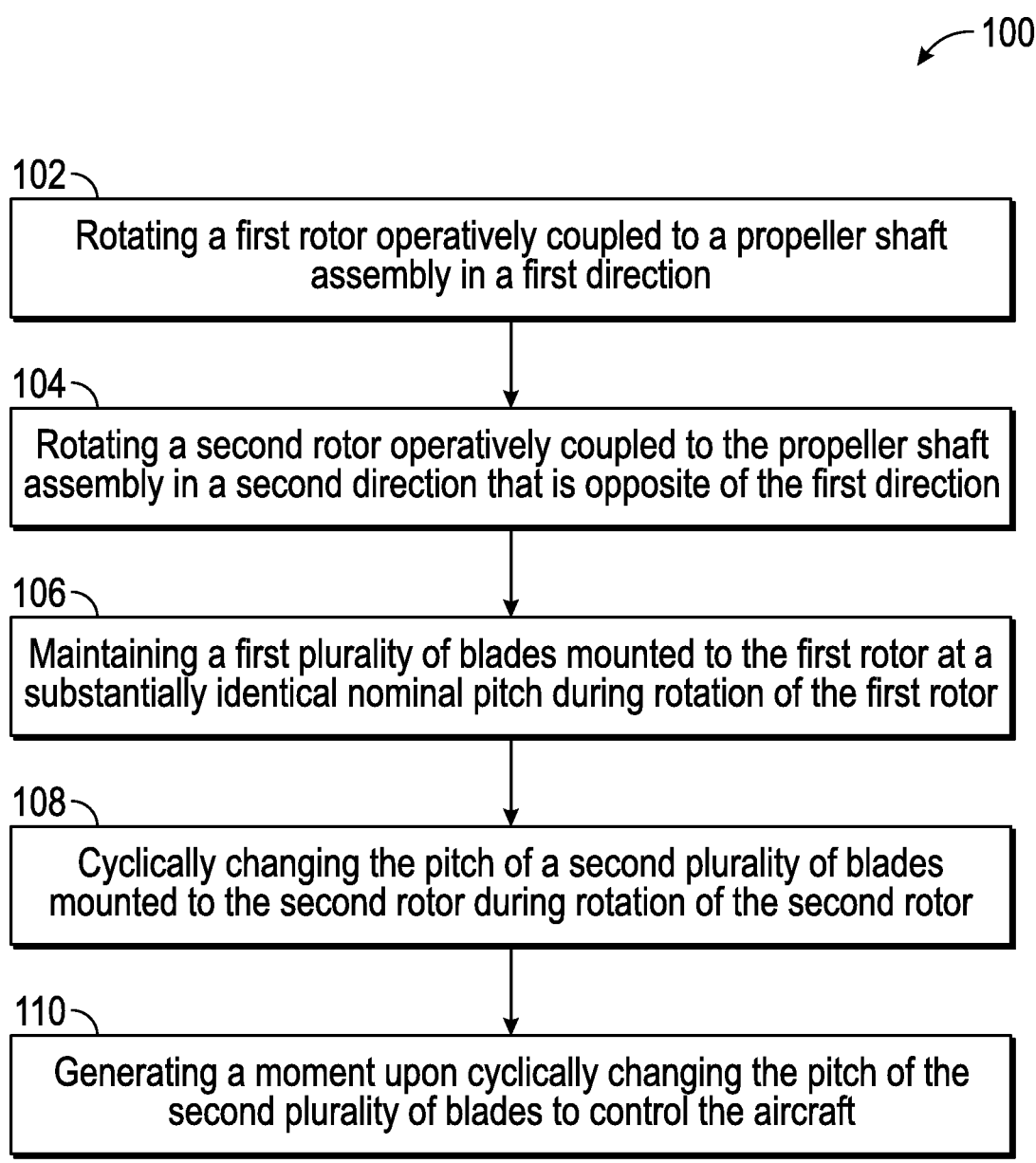
FIG. 4 is a flow diagram illustrating a method of controlling an aircraft with the propeller assembly.

A method of controlling an aircraft 100 is also provided, as illustrated in FIG. 4 and with reference to FIGS. 1-3. The propeller system 20 and, more particularly, the co-axial, counter-rotating propeller shaft assembly 28, have been previously described and specific structural components need not be described in further detail. The method of controlling an aircraft 100 includes rotating 102 the first rotor 34 in a first direction and rotating 104 the second rotor 40 in a second direction that is opposite of the first direction. Each of the first plurality of blades 38 are maintained 106 at a substantially identical nominal pitch during rotation of the first rotor 34. In contrast, the pitch of each of the second plurality of blades 44 is cyclically changed 108 during rotation of the second rotor 40. As a result of cyclically changing the pitch of the second plurality of blades 44, a moment is generated 110 to control the aircraft 80.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

The invention claimed is:

1. An aircraft control system comprising:
   a propeller shaft assembly;
   a first rotor operatively coupled to the propeller shaft assembly, the first rotor having a first plurality of blades mounted thereto, wherein the first plurality of blades are disposed at a substantially identical nominal pitch during rotation of the first rotor, the first rotor rotatable in a first direction; and
   a second rotor operatively coupled to the propeller shaft assembly and rotatable in a second direction that is opposite of the first direction, the second rotor having a second plurality of blades mounted thereto, wherein a pitch of the second plurality of blades cyclically changes during rotation of the second rotor, the first rotor and the second rotor disposed and rotated about a common axis extending parallel to a longitudinal axis of an aircraft, cyclically changing the pitch of the second plurality of blades generating a moment for controlling the aircraft, the longitudinal axis of the aircraft extending from a nose of the aircraft to a tail of the aircraft.

2. The aircraft control system of claim 1, wherein the second rotor is disposed downstream of the first rotor.

3. The aircraft control system of claim 1, wherein the second rotor is disposed upstream of the first rotor.

4. The aircraft control system of claim 1, wherein the aircraft control system is disposed proximate a fixed wing of the aircraft.

5. The aircraft control system of claim 1, wherein the aircraft control system is disposed proximate a nose of the aircraft.

6. The aircraft control system of claim 1, further comprising a pitch change actuator assembly operatively coupled to the propeller shaft assembly, the pitch change actuator assembly controlling the pitch of the second plurality of blades.

\* \* \* \* \*